(12) United States Patent
Wang

(10) Patent No.: US 10,275,014 B2
(45) Date of Patent: Apr. 30, 2019

(54) INFORMATION PROCESSING APPARATUS HAVING ELECTRIC-POWER SAVING MODE, CONTROL METHOD OF THE SAME, AND STORAGE MEDIUM

(71) Applicant: CANON KABUSHIKI KAISHA, Tokyo (JP)

(72) Inventor: Xiaoli Wang, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 138 days.

(21) Appl. No.: 15/361,722

(22) Filed: Nov. 28, 2016

(65) Prior Publication Data

US 2017/0168551 A1   Jun. 15, 2017

(30) Foreign Application Priority Data

Dec. 11, 2015   (JP) .................................. 2015-242168

(51) Int. Cl.
| | | |
|---|---|---|
| *G06F 1/00* | (2006.01) | |
| *G06F 1/26* | (2006.01) | |
| *G06F 1/32* | (2006.01) | |
| *G06F 1/3287* | (2019.01) | |
| *G06F 1/3215* | (2019.01) | |
| *G06F 1/3234* | (2019.01) | |
| *G06F 1/3206* | (2019.01) | |
| *H04N 1/00* | (2006.01) | |

(52) U.S. Cl.
CPC .......... *G06F 1/3287* (2013.01); *G06F 1/3206* (2013.01); *G06F 1/3215* (2013.01); *G06F 1/3284* (2013.01); *H04N 1/00* (2013.01); *Y02D 10/159* (2018.01)

(58) Field of Classification Search
CPC ........................................................ G06F 1/32
See application file for complete search history.

(56) References Cited

U.S. PATENT DOCUMENTS

| | | | | |
|---|---|---|---|---|
| 9,549,373 | B2 * | 1/2017 | Gulati | ............... H04W 52/0235 |
| 2012/0203358 | A1 * | 8/2012 | Lind | .................... B25J 15/0009 |
| | | | | 623/26 |
| 2014/0194871 | A1 * | 7/2014 | Sanai | ............. A61B 17/320092 |
| | | | | 606/41 |
| 2014/0201194 | A1 * | 7/2014 | Reddy | ............... G06F 17/30554 |
| | | | | 707/722 |
| 2015/0015999 | A1 * | 1/2015 | Relyea | ..................... H01H 9/54 |
| | | | | 361/42 |

(Continued)

FOREIGN PATENT DOCUMENTS

| | | | | |
|---|---|---|---|---|
| JP | 2011129061 | A * | 6/2011 | ............... G06F 1/26 |
| JP | 2011129061 | A | 6/2011 | |

*Primary Examiner* — Mohammed H Rehman
(74) *Attorney, Agent, or Firm* — Rossi, Kimms & McDowell LLP

(57) ABSTRACT

An information processing apparatus capable of reliably specifying a notification factor of a detection error. An execution-state monitoring unit monitors an execution state of an electric-power supplying process of supplying electric power to a process executing unit. A response-notification receiving unit receives a response notification from the process executing unit. A notification unit gives a notification that the process executing unit is not detected when an execution of the electric-power supplying process is completed and when the response notification is not received.

8 Claims, 8 Drawing Sheets

(56) References Cited

U.S. PATENT DOCUMENTS

| | | | |
|---|---|---|---|
| 2015/0095686 A1* | 4/2015 | Matthews | G06F 1/3287 713/324 |
| 2015/0288881 A1* | 10/2015 | Jang | H04N 5/23241 348/222.1 |
| 2015/0317115 A1* | 11/2015 | Asai | G06F 3/1236 358/1.15 |

* cited by examiner

INFORMATION PROCESSING APPARATUS HAVING ELECTRIC-POWER SAVING MODE, CONTROL METHOD OF THE SAME, AND STORAGE MEDIUM

BACKGROUND OF THE INVENTION

Field of the Invention

The present invention relates to an information processing apparatus, a control method of the same, and a storage medium and particularly relates to the information processing apparatus having an electric-power saving mode, the control method of the same, and the storage medium.

Description of the Related Art

MFP has been known as an information processing apparatus which makes a transition to an electric-power saving mode, which reduces electric power consumption, if predetermined processing is not being executed. In the electric-power saving mode, electric power is supplied only to requisite minimum component elements provided in MFP. MFP includes a main system, which comprehensively controls this entire MFP, and a subsystem, which executes respective processes. In the electric-power saving mode, when MFP receives an instruction for executing a process, returning from the electric-power saving mode is instructed from the main system to the subsystem (for example, see Japanese Laid-Open Patent Publication (kokai) No. 2011-129061). The subsystem includes a plurality of component elements such as a CPU, an image processing unit, and the like. When the returning from the electric-power saving mode is instructed, electric power is supplied to each of the component elements. When the electric power is supplied, the CPU of the subsystem starts a detection process of detecting the image processing unit to be subjected to initialization, and subjects the image processing unit to polling. In this polling, if a response notification is received from the image processing unit, the CPU starts initialization of the image processing unit; and, if the response notification is not received during a predetermined period, the CPU gives a notification of a detection error showing a fact that the image processing unit has not been detected. When the notification of the detection error is given, a user carries out a process for resolving the detection error.

However, a plurality of factors are conceivable as the factors why the detection error is notified since the response notification cannot be received during the predetermined period (hereinafter, referred to as "notification factors of the detection error"). Examples of the plurality of factors include an error of the main system, an error of the image processing unit, and delay of electric power supply to the image processing unit. However, it is difficult to specify which factor it is only by the whether the response notification is present or absent. As a result, there is a case in which, even though the delay of electric power supply to the image processing unit is a notification factor of the detection error, a user or a serviceperson determines that the image processing unit has malfunctioned and then carries out a wasteful replacement operation of the image processing unit.

SUMMARY OF THE INVENTION

The present invention provides an information processing apparatus capable of reliably specifying a notification factor of a detection error, a control method of the same, and a storage medium.

Accordingly, the present invention provides an information processing apparatus having a process executing unit, configured to detect the process executing unit when a transition is to be made from an electric-power saving mode to a normal mode, and configured to initialize the detected process executing unit, the information processing apparatus comprising an execution-state monitoring unit configured to monitor an execution state of an electric-power supplying process of supplying electric power to the process executing unit, a response-notification receiving unit configured to receive a response notification from the process executing unit, and a notification unit configured to give a notification that the process executing unit is not detected when execution of the electric-power supplying process is completed and when the response notification is not received.

According to the present invention, the notification factor of the detection error can be reliably specified.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the drawings.

In the present embodiment, a case in which the present invention is applied to MFP as an information processing apparatus which returns from an electric-power saving mode will be described. However, the present invention is applied to not only MFP but also an information processing apparatus capable of carrying out polling between component elements provided therein.

Figure 1:
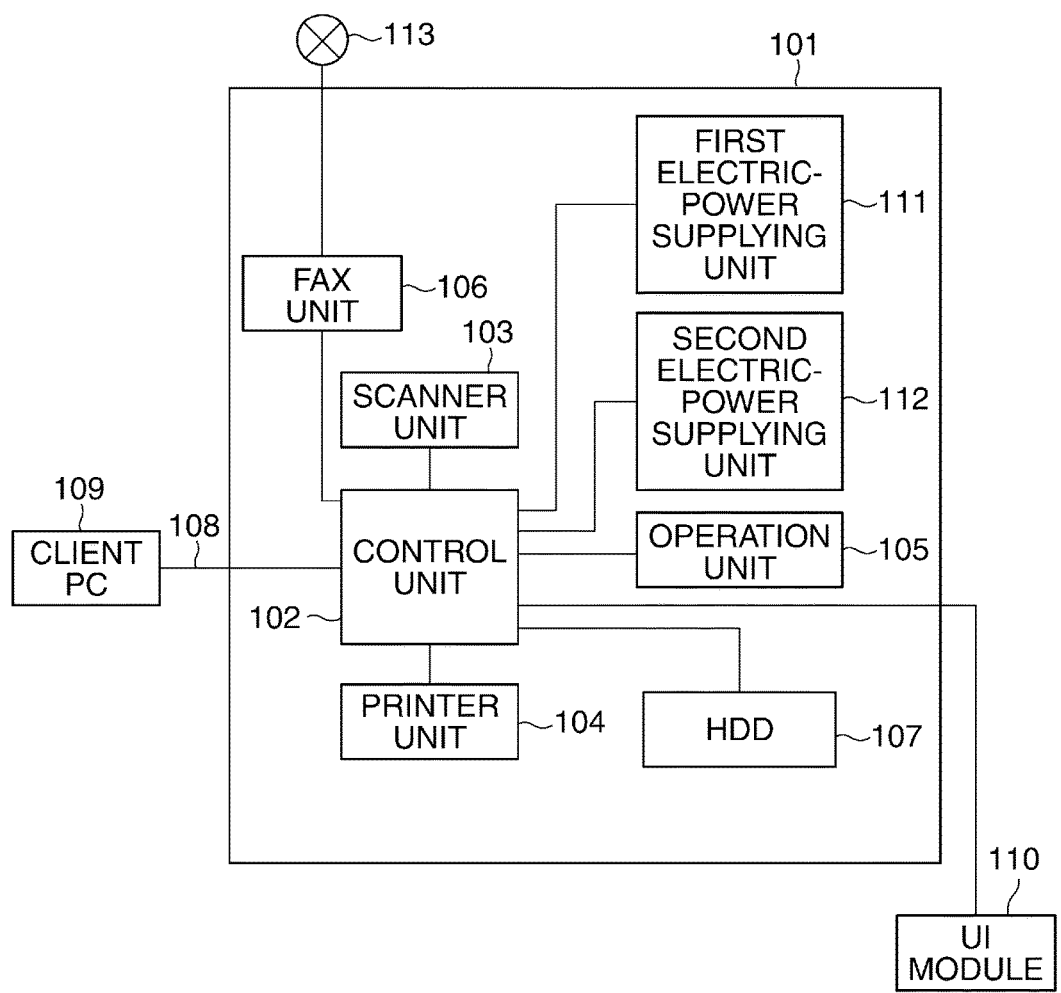
FIG. 1 is a block diagram schematically showing a configuration of MFP as an information processing apparatus according to an embodiment of the present invention.

FIG. 1 is a block diagram schematically showing a configuration of a MFP 101 as an information processing apparatus according to an embodiment of the present invention.

In FIG. 1, the MFP 101 includes a control unit 102, a scanner unit 103, a printer unit 104, an operation unit 105, a FAX unit 106, a HDD 107, a first electric-power supplying unit 111, and a second electric-power supplying unit 112. The control unit 102 is connected to each of the scanner unit 103, the printer unit 104, the operation unit 105, the FAX unit 106, the HDD 107, the first electric-power supplying unit 111, and the second electric-power supplying unit 112.

The MFP 101 is capable of executing processes such as scan processes, printer processes, and FAX processes and, if a predetermined process is not being executed, makes a transition to an electric-power saving mode in which electric power consumption is reduced. The control unit 102 comprehensively controls the MFP 101. Moreover, the control unit 102 carries out data communication with the client PC 109, which is connected via a LAN 108, and the UI module 110, which is connected by an unshown USB cable or the like. The scanner unit 103 reads an original disposed on an unshown platen, generates image data, and transmits the generated image data to the control unit 102. The printer unit 104 carries out printing processes based on the image data generated by the scanner unit 103, print data transmitted from the client PC 109, and the like. The operation unit 105 includes an unshown LCD panel, which displays setting information, and the like of the MFP 101, and unshown operation buttons used for settings of the MFP 101. The FAX unit 106 carries out facsimile communication with an unshown external apparatus(es) via a phone line 113. The HDD 107 stores control programs and data used by the control unit 102. Each of the first electric-power supplying unit 111 and the second electric-power supplying unit 112 supplies electric power to the control unit 102. It should be noted that, in the present embodiment, as an example, a configuration in which the first electric-power supplying unit 111 and the second electric-power supplying unit 112 are not mounted in the control unit 102 is described, but a configuration to which the present invention is applied is not limited to this configuration. For example, the present invention can be applied to a configuration in which at least one of the first electric-power supplying unit 111 and the second electric-power supplying unit 112 is mounted in the control unit 102.

Figure 2:
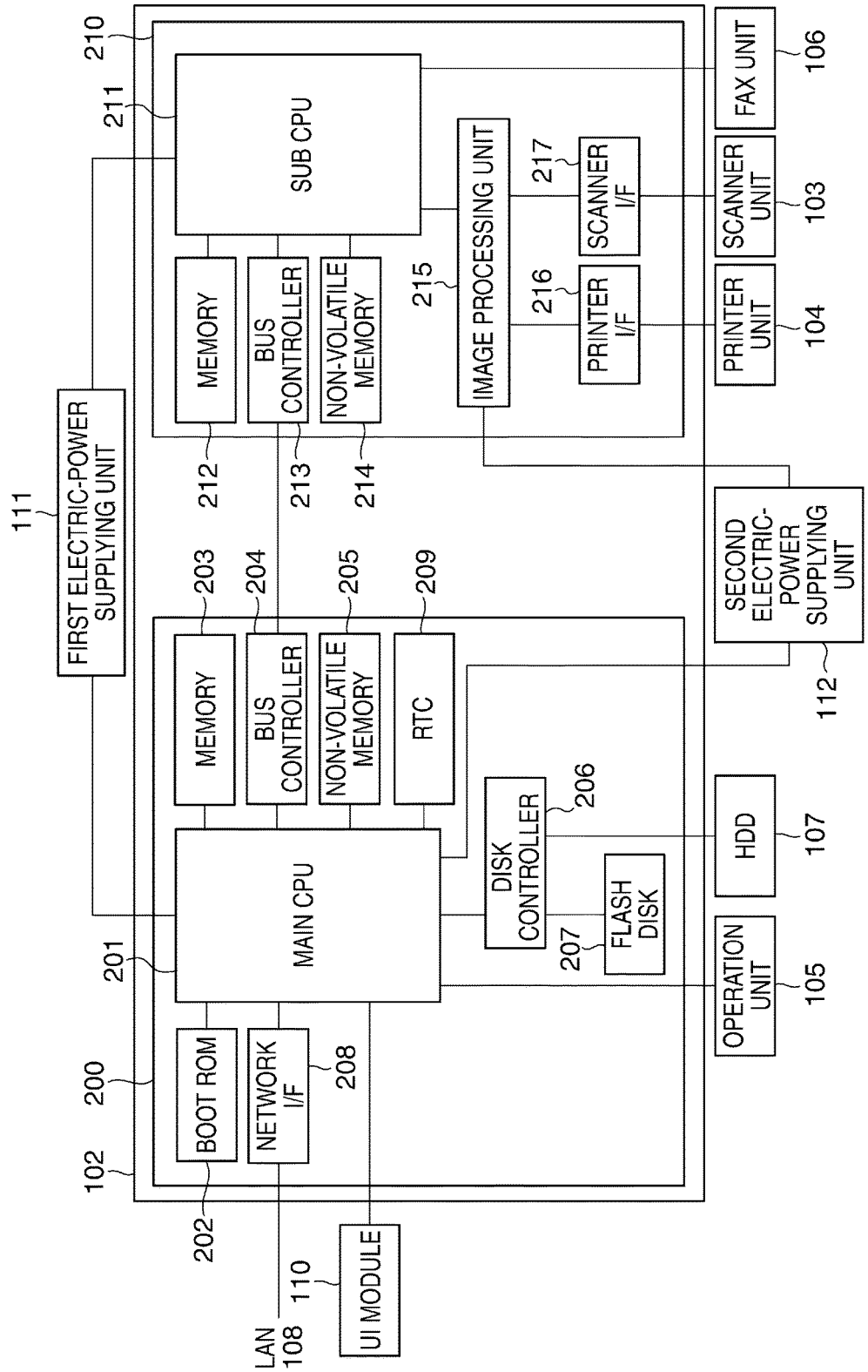
FIG. 2 is a block diagram schematically showing a configuration of a control unit in FIG. 1.

FIG. 2 is a block diagram schematically showing a configuration of the control unit 102 in FIG. 1.

In FIG. 2, the control unit 102 includes a main system 200 and a subsystem 210. The main system 200 is connected to each of the subsystem 210, the operation unit 105, the HDD 107, the UI module 110, the first electric-power supplying unit 111, and the second electric-power supplying unit 112. The subsystem 210 is connected to each of the scanner unit 103, the printer unit 104, the FAX unit 106, the first electric-power supplying unit 111, and the second electric-power supplying unit 112. The main system 200 includes a main CPU 201, a boot ROM 202, a memory 203, a bus controller 204, a non-volatile memory 205, and a disk controller 206. Moreover, the main system 200 includes a flash disk 207, a network I/F 208, and an RTC (Real-Time Clock) 209. The main CPU 201 is connected to each of the boot ROM 202, the memory 203, the bus controller 204, the non-volatile memory 205, the disk controller 206, the network I/F 208, and the RTC 209. The disk controller 206 is connected to the flash disk 207. The subsystem 210 includes a sub CPU 211, a memory 212, a bus controller 213, a non-volatile memory 214, an image processing unit 215 (process executing unit), a printer I/F 216, and a scanner I/F 217. The sub CPU 211 is connected to each of the memory 212, the bus controller 213, the non-volatile memory 214, and the image processing unit 215; and the image processing unit 215 is connected to each of the printer I/F 216 and the scanner I/F 217.

The main system 200 comprehensively controls the connected component elements. The main CPU 201 executes programs stored in the HDD 107, the boot ROM 202, and the like and carries out control including transition control of an electric-power mode. In the present embodiment, for example, if a returning from the electric-power saving mode is instructed during the electric-power saving mode of the MFP 101, the main CPU 201 instructs the first electric-power supplying unit 111 and the second electric-power supplying unit 112 to supply electric power to the subsystem 210 (hereinafter, referred to as "electric-power supply instruction"). When receiving the electric-power supply instruction, each of the first electric-power supplying unit 111 and the second electric-power supplying unit 112 starts an electric-power supplying process. As a result, the first electric-power supplying unit 111 supplies electric power to the sub CPU 211, and the second electric-power supplying unit 112 supplies electric power to the image processing unit 215. When the electric-power supplying processes by the first electric-power supplying unit 111 and the second electric-power supplying unit 112 is completed, the electric-power mode of the MFP 101 makes a transition from the electric-power saving mode to a normal mode. The boot ROM 202 stores a boot program, and the like executed by the main CPU 201. The memory 203 is used as a work area of the main CPU 201. The bus controller 204 carries out data communication with the subsystem 210. The non-volatile memory 205 stores setting data, and the like used by the main CPU 201. The disk controller 206 controls a process of storing data into the HDD 107. The flash disk 207 is a non-volatile storage device which includes a semiconductor device and has a comparatively-small capacity. The network I/F 208 carries out data communication with the client PC 109, and the like via the LAN 108. The RTC 209 carries out a timing process.

In accordance with instructions transmitted from the main system 200, the subsystem 210 carries out processes including a printer process, a scan process, a facsimile communication process, and the like. The sub CPU 211 executes the program(s) stored in the HDD 107, and the like and carries out various controls. The memory 212 is used as a work area of the sub CPU 211. The bus controller 213 carries out data communication with the main system 200. The non-volatile memory 214 stores the programs, setting data, and the like used by the sub CPU 211. The image processing unit 215 carries out image processing of the image data used by the scanner unit 103 and the printer unit 104. The printer I/F 216 carries out data communication with the printer unit 104, and the scanner I/F 217 carries out data communication with the scanner unit 103.

Next, a copy process executed by the control unit 102 will be described.

When execution of a copy process is instructed through an operation of the operation unit 105 by a user, the main CPU 201 instructs, via the sub CPU 211, the scanner unit 103 to execute a scan process. As a result, the scanner unit 103 reads an original disposed on the unshown platen, generates image data, and transmits the image data to the image processing unit 215. The image data is stored in the memory 212 via the sub CPU 211. Then, when the main CPU 201 detects that the image data has been stored in the memory 212, the main CPU 201 instructs, via the sub CPU 211, the printer unit 104 to execute a printing process. As a result, the printer unit 104 carries out the printing process of the image data stored in the memory 212.

Next, a return process from the electric-power saving mode executed by the control unit 102 will be described.

Figure 3:
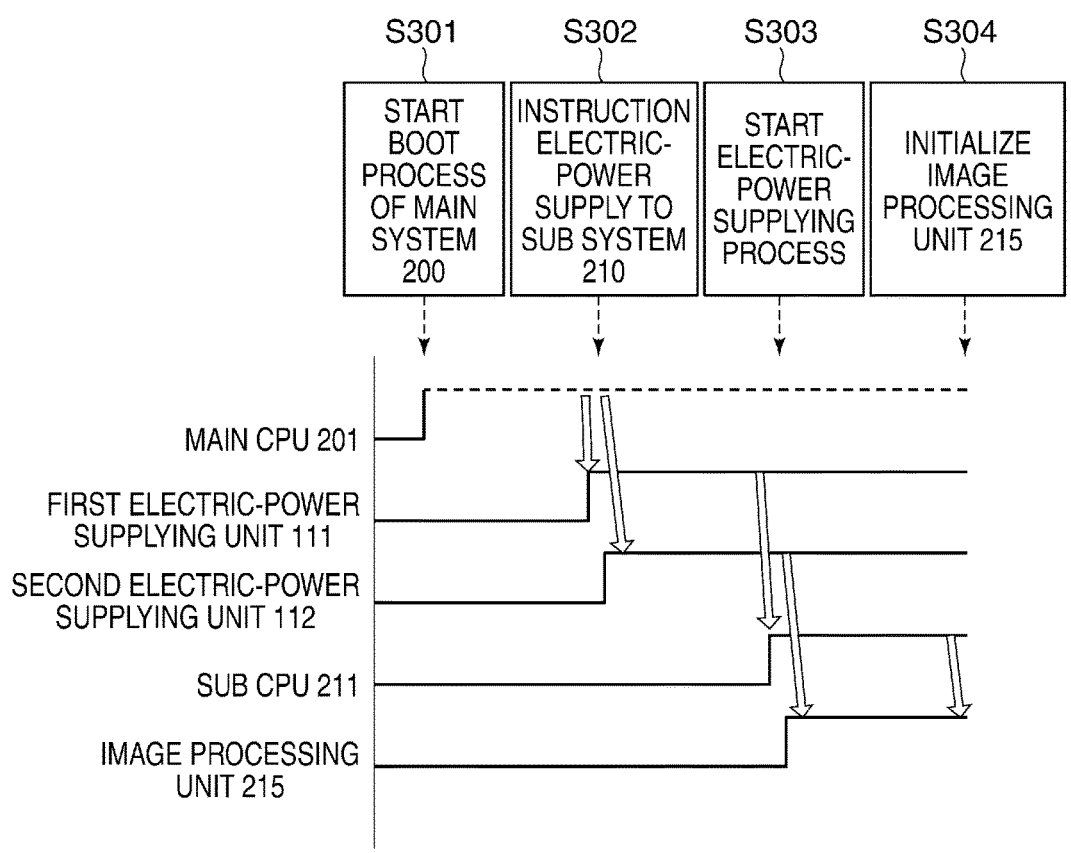
FIG. 3 is a timing chart for describing a returning from an electric-power saving mode of the control unit in FIG. 1.

FIG. 3 is a timing chart for describing a return from the electric-power saving mode of the control unit 102 in FIG. 1.

Figure 4A:
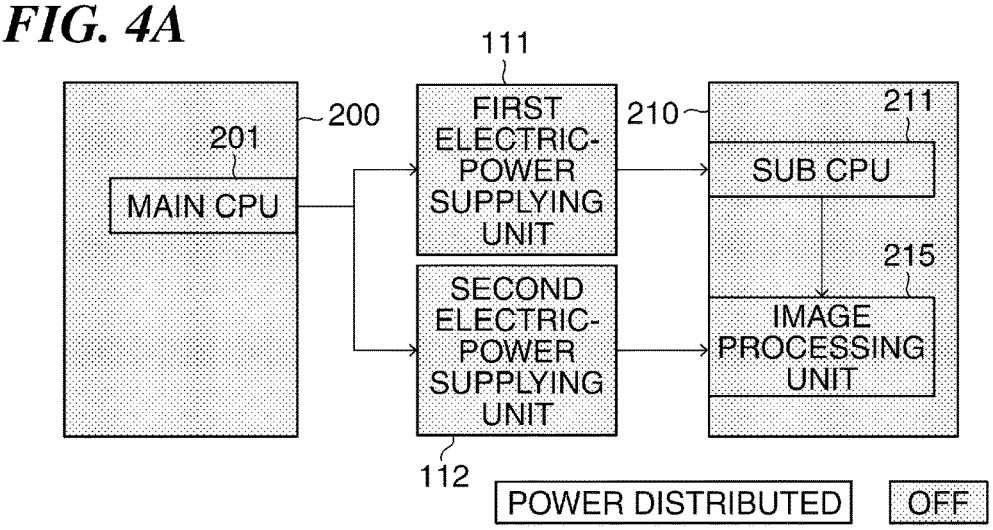
FIG. 4A to FIG. 4C are diagrams showing respective supply states of electric power in the control unit in FIG. 1.
Figure 4B:
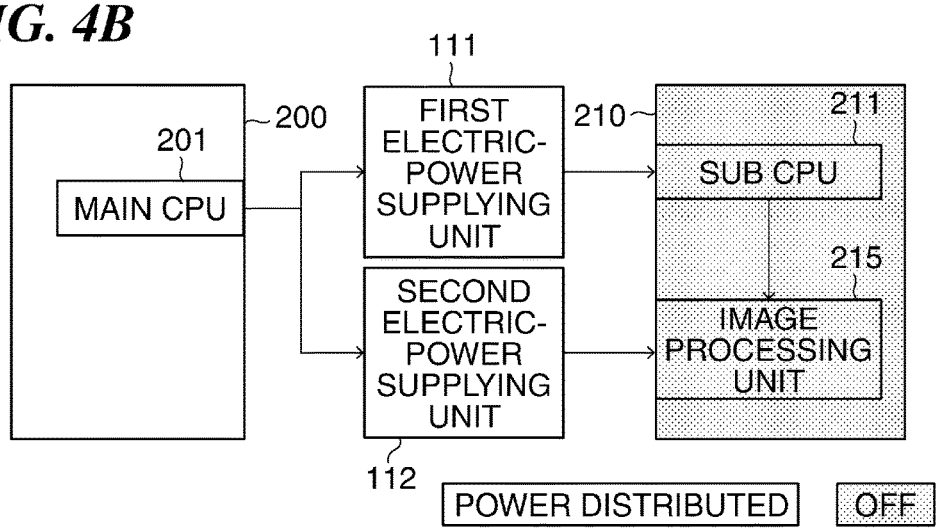
Figure 4C:
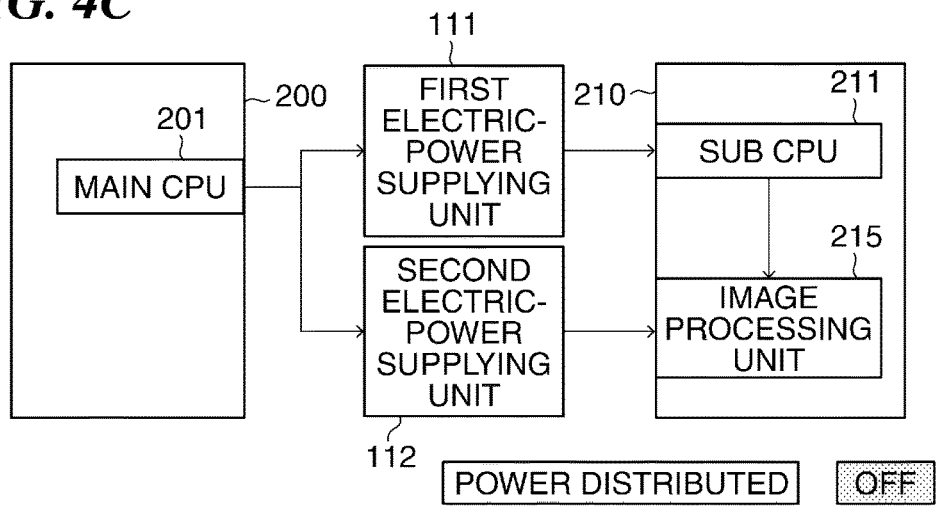

In FIG. 3, first, if a predetermined process is not being executed, the control unit 102 makes a transition to the electric-power saving mode and then waits in the electric-power saving mode until returning from the electric-power saving mode is instructed. When the MFP 101 makes a transition to the electric-power saving mode, as shown in FIG. 4A, electric power is not supplied to the main system 200, the subsystem 210, the first electric-power supplying unit 111, and the second electric-power supplying unit 112. Then, when returning from the electric-power saving mode is instructed, the control unit 102 starts a boot process of the main system 200 (step S301). When the boot process of the main system 200 is completed, as shown in FIG. 4B, electric power is supplied to each of the first electric-power supplying unit 111 and the second electric-power supplying unit 112. Then, the main CPU 201 of the control unit 102 instructs each of the first electric-power supplying unit 111 and the second electric-power supplying unit 112 to supply electric power to the subsystem 210 (step S302). In accordance with the electric-power supply instruction, each of the first electric-power supplying unit 111 and the second electric-power supplying unit 112 starts the electric-power supplying process (step S303). When all the electric-power supplying processes are completed and electric power is supplied to the subsystem 210 as shown in FIG. 4C, the sub CPU 211 of the control unit 102 executes an initialization process of FIG. 5 and a monitoring initialization process of FIG. 7 described later to initialize the image processing unit 215 (step S304).

Figure 5:
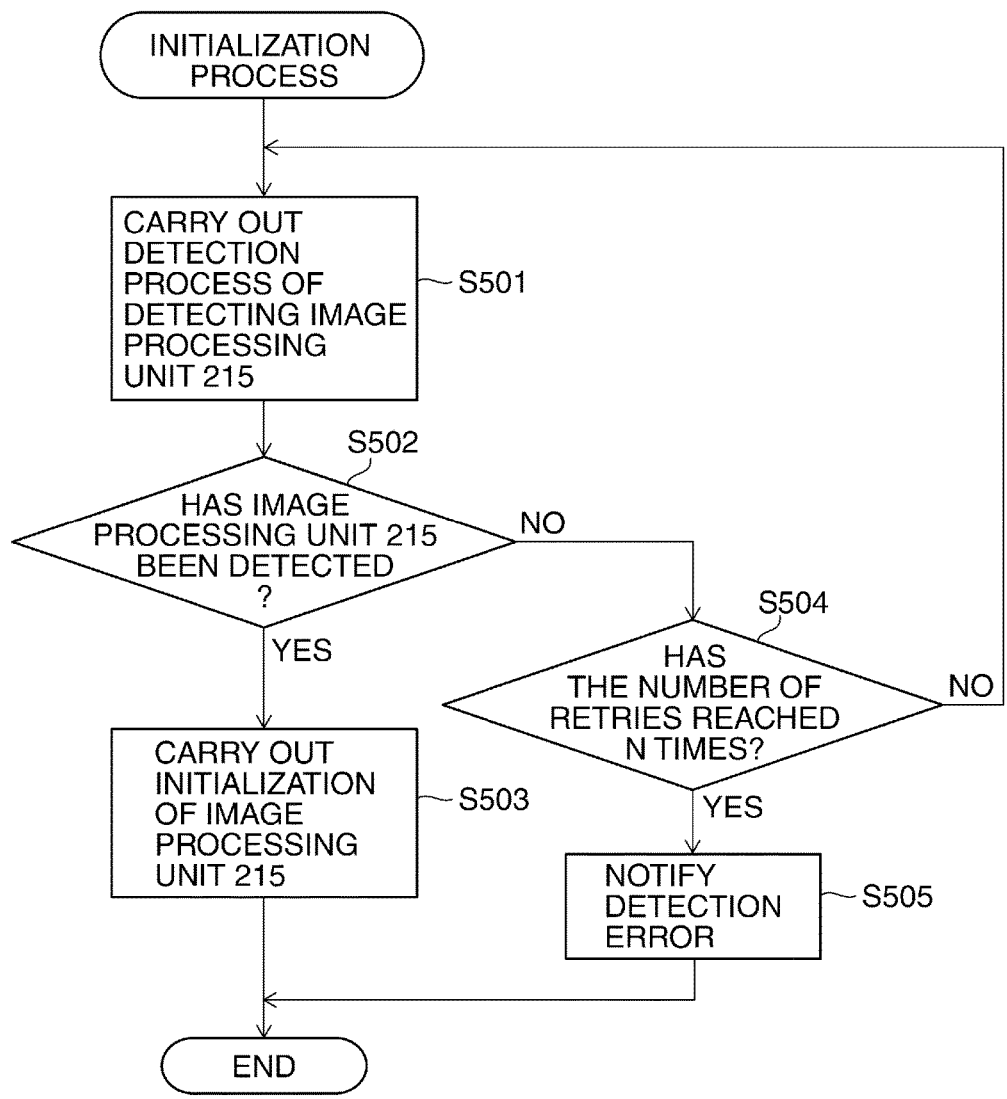
FIG. 5 is a flowchart showing a procedure of an initialization process executed by the control unit in FIG. 1.

FIG. 5 is a flowchart showing a procedure of the initialization process executed by the control unit 102 in FIG. 1.

The process of FIG. 5 is carried out by executing the program(s), which is stored in the HDD 107, the non-volatile memory 214, and the like, by the sub CPU 211.

In FIG. 5, first, the sub CPU 211 carries out a detection process of detecting the image processing unit 215 (step S501). Specifically, the sub CPU 211 carries out polling with the image processing unit 215 and transmits transmission request notifications requesting a response notification to the image processing unit 215 at intervals set in advance. Then, the sub CPU 211 judges whether the image processing unit 215 has been detected or not (step S502). In the step S502, for example, if the sub CPU 211 has received the response notification from the image processing unit 215 (response-notification receiving unit), the sub CPU 211 judges that the image processing unit 215 has been detected. On the other hand, if the sub CPU 221 has not received the response notification, the sub CPU 221 judges that the image processing unit 215 has not been detected. The sub CPU 211 outputs a reception result of the response notification as log information (log-information outputting unit).

If the image processing unit 215 is detected as a result of the judgement in the step S502, the sub CPU 211 carries out initialization of the detected image processing unit 215 (step S503) and terminates the present process. On the other hand, if the image processing unit 215 is not detected as a result of the judgement in the step S502, the sub CPU 211 counts the number of times of transmission of the transmission request notification, in other words, the number of times of retries. The sub CPU 211 judges whether the number of times of retries has reached N times set in advance (step S504).

If the number of times of retries does not reach the N times as a result of the judgement in the step S504, the sub CPU 211 returns to the process in the step S501. On the other hand, if the number of times of retries reaches the N times as a result of the judgement in the step S504, the sub CPU 211 gives a notification of a detection error indicating that the image processing unit 215 is not detected (step S505). When the detection error is notified, a user carries out a process of resolving the detection error. Then, the sub CPU 211 terminates the present process.

Figure 6:
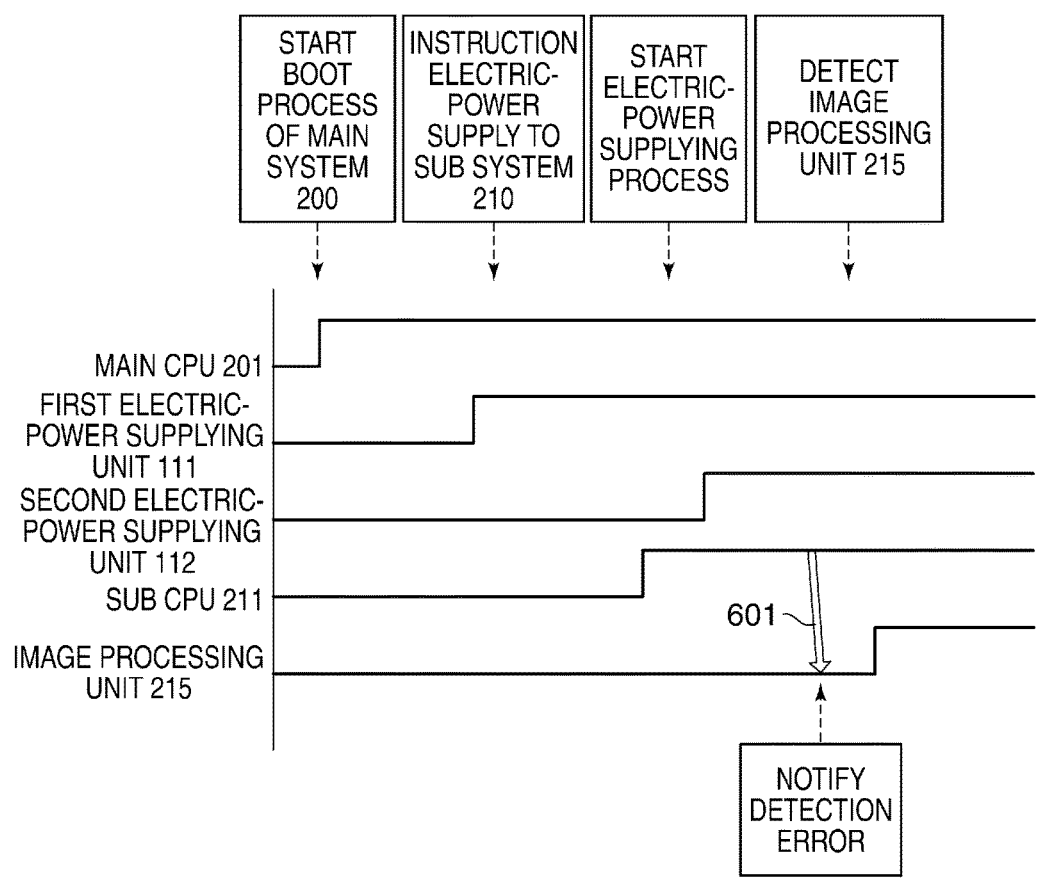
FIG. 6 is a diagram for describing a problem occurred in a detection process of detecting an image processing unit in conventional MFP.

Herein, a plurality of factors are conceivable as a notification factor of the above described detection error. Examples of the plurality of factors include a defect of the main system 200, malfunctioning of the image processing unit 215, and delay of electric power supply to the image processing unit 215. However, it is difficult to specify which factor it is only by whether the response notification. As a result, there is a case in which, even though the delay of electric power supply to the image processing unit 215 is a notification factor of the detection error as shown by an arrow 601 of FIG. 6, the user determines that the image processing unit 215 has malfunctioned and carries out a wasteful replacement operation of the image processing unit 215.

In response to this, in the present embodiment, if the electric-power supplying process of the image processing unit 215 is completed and the response notification from the image processing unit 215 is not received, the detection error is notified.

Figure 7:
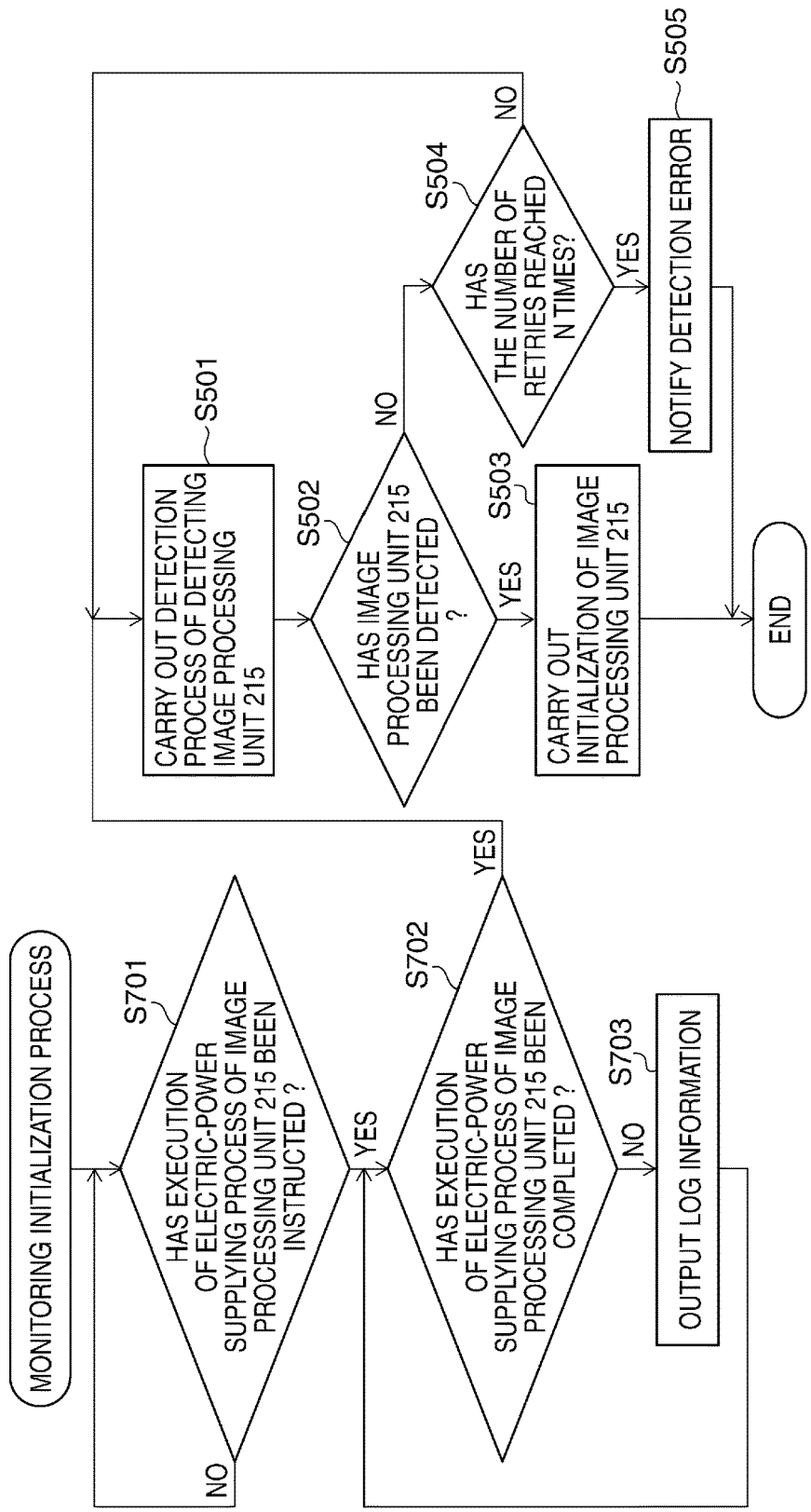
FIG. 7 is a flowchart showing a procedure of a monitoring initialization process executed by the control unit in FIG. 1.

FIG. 7 is a flowchart showing a procedure of the monitoring initialization process executed by the control unit 102 in FIG. 1.

The process of FIG. 7 is carried out by executing the program(s), which is stored in the non-volatile memory 214, and the like, by the sub CPU 211.

Figure 8:
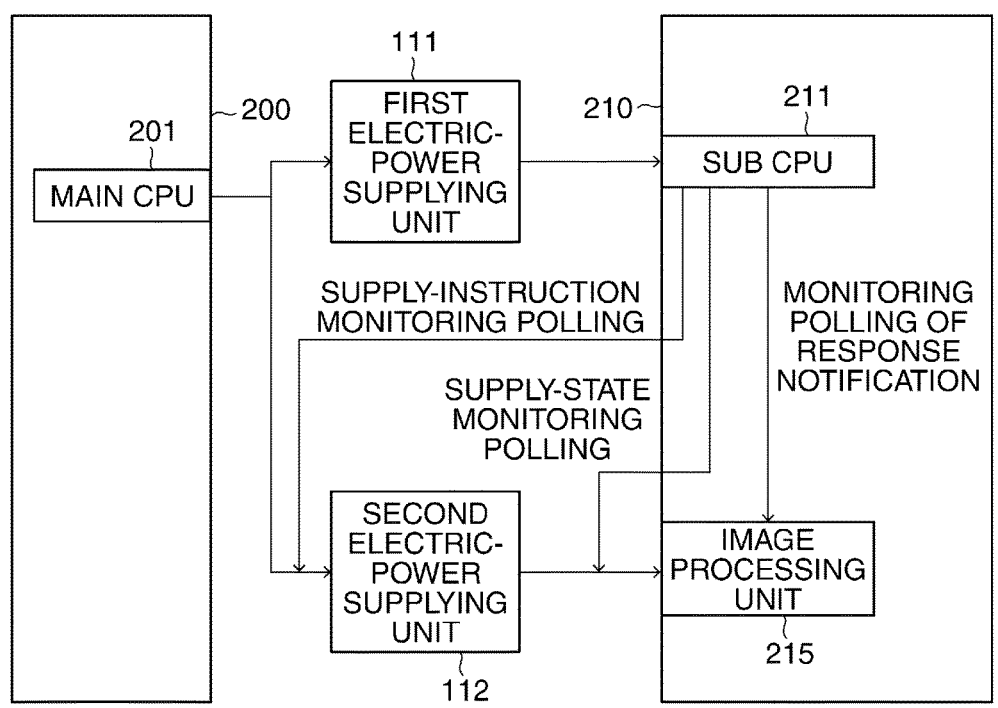
FIG. 8 is a diagram for describing polling executed by a sub CPU in FIG. 2.

In FIG. 7, first, the sub CPU 211 judges whether the electric-power supply instruction has been given from the main CPU 201 to the second electric-power supplying unit 112 or not, in other words, whether execution of the electric-power supplying process of the image processing unit 215 has been instructed or not (step S701). Specifically, as shown in FIG. 8, the sub CPU 211 carries out polling for monitoring the electric-power supply instruction (hereinafter, referred to as "supply-instruction monitoring polling") together with the main CPU 201. Moreover, the sub CPU 211 outputs a monitoring result of the supply-instruction monitoring polling as log information (log-information outputting unit). Then, when execution of the electric-power supplying process of the image processing unit 215 is instructed (YES in the step S701), the sub CPU 211 judges whether execution of the electric-power supplying process of the image processing unit 215 has been completed or not (step S702). Specifically, as shown in FIG. 8, the sub CPU 211 carries out polling for monitoring the execution state of the electric-power supplying process of the image processing unit 215 (hereinafter, "supply-state monitoring polling") together with the image processing unit 215 (execution-state monitoring unit). Moreover, the sub CPU 211 outputs the monitoring result of the supply-state monitoring polling as log information (log-information outputting unit).

As a result of the judgement in the step S702, if the execution of the electric-power supplying process of the image processing unit 215 is not completed, the sub CPU 211 outputs log information indicating that the electric-power supplying process of the image processing unit 215 is being executed (step S703) (log-information outputting unit). Then, the sub CPU 211 returns to the process in the step S702. On the other hand, as a result of the judgement in the step S702, if the execution of the electric-power supplying process of the image processing unit 215 is completed, the sub CPU 211 carries out the process in the step S501 of FIG. 5 and the processes following that. In other words, in the present embodiment, after whether the execution of the electric-power supplying process of the image processing unit 215 has been completed or not is judged, the detection process of detecting the image processing unit 215 is carried out.

According to the above described process of FIG. 7, if the execution of the electric-power supplying process of the image processing unit 215 is completed and if the response notification from the image processing unit 215 is not received, the fact that the image processing unit 215 is not detected is notified. By virtue of this, for example, if the execution of the electric-power supplying process of the image processing unit 215 is not completed since there is delay in the electric-power supply to the image processing unit 215, and, as a result, the response notification is not output due to a low voltage of the image processing unit 215; wherein, notification of the detection error can be prevented. Thus, whether the image processing unit 215 is not detected or not is judged not only by the fact that the response notification is not received, but also based on the execution state of the electric-power supplying process of the image processing unit 215. Therefore, the notification factor of the detection error can be reliably specified.

Moreover, in the above described process of FIG. 7, whether the execution of the electric-power supplying process of the image processing unit 215 has been instructed by the main CPU 201 or not is monitored. By virtue of this, for example, if the electric-power supplying process of the image processing unit 215 is not executed since the electric-power supply instruction is not given only to the second electric-power supplying unit 112 due to a system defect of the main CPU 201, and, as a result, the response notification is not output from the image processing unit 215; wherein, notification of the detection error can be prevented. Thus, whether the image processing unit 215 is not detected or not is judged not only by the fact that the response notification is not received, but also based on whether the instruction of the electric-power supplying process is present or absent. Therefore, the notification factor of the detection error can be reliably specified.

Furthermore, in the above described process of FIG. 7, the monitoring result of the supply-state monitoring polling, the reception result of the response notification, and the monitoring result of the supply-instruction monitoring polling are output as log information. By virtue of these, the notification factor of the detection error can be analyzed.

In the above described process of FIG. 7, since the transmission request notifications of the response notification are transmitted to the image processing unit 215 at the set interval, a predetermined period can be provided until notification of a detection error is determined after the execution of the electric-power supplying process of the image processing unit 215 is completed. By virtue of this, for example, if the response notification is not output because the voltage of the image processing unit 215 has not been sufficiently increased yet since time has not sufficiently elapsed although the execution of the electric-power supplying process of the image processing unit 215 is completed; wherein, notification of the detection error can be prevented. As a result, improper notification of the detection error can be prevented.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-242168, filed Dec. 11, 2015, which is hereby incorporated by reference herein in its entirety.

What is claimed is:

1. An information processing apparatus having an image processor, configured to detect the image processor when a transition is to be made from an electric-power saving mode to a normal mode, and configured to initialize the detected image processor, the information processing apparatus comprising:
    a controller including at least one processor configured to implement instructions stored in at least one memory and execute a plurality of tasks, including:
        an execution-state monitoring task that monitors an execution state of supplying electric power to the image processor;
        a response-notification receiving task that receives a response notification from the image processor;
        a determining task that, in a case where the execution-state monitoring task detects that the electric-power is supplied to the image processor, determine whether or not the response-notification receiving task has received the response notification from the image processor; and
        a notification task that, in a case where the determining task determines that the response notification has not been received from the image processor, notify that the image processor is not detected.

2. The information processing apparatus of claim 1, wherein the plurality of tasks include:
    an instruction task that instructs supplying of power to the image processor; and
    an instruction monitoring task that monitors whether supplying of power to the image processor has been instructed by the instruction task.

3. The information processing apparatus of claim 2, wherein the plurality of tasks include a log-information outputting task that outputs a monitoring result of the execution-state monitoring task, a reception result of the response notification, and a monitoring result of the instruction monitoring task as log information.

4. The information processing apparatus of claim 1, wherein the plurality of tasks include a transmission task that transmits a transmission request notification of the response notification to the image processor at a set interval.

5. The information processing apparatus of claim 1, wherein the determining task determines whether or not the response-notification receiving task has received the response notification from the image processor after the execution-state monitoring task detects that power is supplied to the image processor.

6. The information processing apparatus of claim 1, wherein the determining task determines based on whether or not the execution-state monitoring task detects that power is supplied to the image processor.

7. A control method of controlling an information processing apparatus having an image processor, configured to detect the image processor when a transition is to be made from an electric-power saving mode to a normal mode, and configured to initialize the detected image processor, the control method comprising:

an execution-state monitoring step of monitoring an execution state of supplying electric power to the image processor;

a response-notification receiving step of receiving a response notification from the image processor;

a determining step of, in a case where the execution-state monitoring step detects that the electric-power is supplied to the image processor, determining whether or not the response-notification receiving step has received the response notification from the image processor; and a notification step of, in a case where the determining step determines that the response notification has not been received from the image processor, notifying that the image processor is not detected.

8. A computer-readable non-transitory storage medium storing a program executable by a computer to execute a control method of controlling an information processing apparatus having an image processor, configured to detect the image processor when a transition is to be made from an electric-power saving mode to a normal mode, and configured to initialize the detected image processor, the control method of the information processing apparatus including:

an execution-state monitoring step of monitoring an execution state of supplying electric power to the image processor;

a response-notification receiving step of receiving a response notification from the image processor;

a determining step of, in a case where the execution-state monitoring step detects that the electric-power is supplied to the image processor, determining whether or not the response-notification receiving step has received the response notification from the image processor; and a notification step of, in a case where the determining step determines that the response notification has not been received from the image processor, notifying that the image processor is not detected.

* * * * *